(12) United States Patent
Riggs et al.

(10) Patent No.: US 12,240,689 B2
(45) Date of Patent: Mar. 4, 2025

(54) WASTE MANAGEMENT AND STORAGE APPARATUS AND METHOD

(71) Applicant: Pario, LLC, Carmel, IN (US)

(72) Inventors: Jordan Riggs, Carmel, IN (US); Tom Bratton, Carmel, IN (US); Jereme Gilbert, Carmel, IN (US); Larry Tsai, Carmel, IN (US)

(73) Assignee: Pario, LLC, Carmel, IN (US)

( * ) Notice: Subject to any disclaimer, the term of this patent is extended or adjusted under 35 U.S.C. 154(b) by 0 days.

(21) Appl. No.: 18/025,502

(22) PCT Filed: Sep. 10, 2021

(86) PCT No.: PCT/US2021/049812
§ 371 (c)(1),
(2) Date: Mar. 9, 2023

(87) PCT Pub. No.: WO2022/056229
PCT Pub. Date: Mar. 17, 2022

(65) Prior Publication Data
US 2024/0025636 A1    Jan. 25, 2024

Related U.S. Application Data

(60) Provisional application No. 63/076,594, filed on Sep. 10, 2020.

(51) Int. Cl.
*B65F 1/06* (2006.01)
*B65F 1/16* (2006.01)

(52) U.S. Cl.
CPC ............ *B65F 1/062* (2013.01); *B65F 1/1607* (2013.01); *B65F 2210/126* (2013.01);
(Continued)

(58) Field of Classification Search
CPC .. B65F 1/06; B65F 1/062; B65F 1/067; B65F 1/1607; B65F 2210/126; B65F 2210/138;
(Continued)

(56) References Cited

U.S. PATENT DOCUMENTS 3,648,302 A * 3/1972 Winters ............... A47K 11/026
  4/484
3,665,522 A * 5/1972 Backlund et al. ... A47K 11/026
  4/484
(Continued)

FOREIGN PATENT DOCUMENTS

JP    07330103 A * 12/1995 ............. B65F 1/004

OTHER PUBLICATIONS

International Search Report; International Searching Authority; International Application No. PCT/US21/49812; Dec. 14, 2021; 2 pages.
(Continued)

*Primary Examiner* — Stephen F. Gerrity
(74) *Attorney, Agent, or Firm* — Taft Stettinius & Hollister LLP; Derek B. Lavender

(57) ABSTRACT

A method for sealing refuse in a sealed chamber. The method includes providing an opening to deposit refuse into a chamber formed of a material that is partially sealed, identifying when refuse is deposited into the partially sealed chamber, activating a sealing assembly after refuse is deposited into the chamber to seal the refuse in the chamber defined by the material, executing a cutting procedure to separate the sealed chamber from the remaining material, the cutting procedure creating a second chamber being formed by partially sealed material, and drawing a length of the material from a reservoir containing tubular shirred material with an extraction assembly.

19 Claims, 14 Drawing Sheets

(52) U.S. Cl.
CPC ... *B65F 2210/138* (2013.01); *B65F 2210/167* (2013.01); *B65F 2210/168* (2013.01); *B65F 2240/132* (2013.01)

(58) Field of Classification Search
CPC ........ B65F 2210/1443; B65F 2210/152; B65F 2210/167; B65F 2210/168; B65F 2240/132; B65B 9/15; B65B 9/18; A47K 11/026; Y02W 30/10
USPC .................................. 53/459, 479, 567, 576
See application file for complete search history.

(56) References Cited

U.S. PATENT DOCUMENTS

| | | | |
|---|---|---|---|
| 3,746,159 A | 7/1973 | May | |
| 4,519,104 A * | 5/1985 | Nilsson | B65F 1/062 4/484 |
| 4,790,124 A * | 12/1988 | Kaji | B65B 9/15 53/576 |
| 4,896,760 A | 3/1990 | Triantafilou et al. | |
| 5,188,254 A | 2/1993 | Evans | |
| 6,065,272 A * | 5/2000 | Lecomte | B65F 1/062 53/567 |
| 6,560,948 B1 * | 5/2003 | Fuss et al. | B65B 9/15 53/576 |
| 6,719,194 B2 * | 4/2004 | Richards | B65F 1/062 53/567 |
| 8,752,723 B2 * | 6/2014 | Lucas et al. | B65F 1/062 53/567 |
| 2006/0010837 A1 | 1/2006 | Jurus | |
| 2012/0110956 A1 * | 5/2012 | Miller | B65B 51/146 53/479 |
| 2014/0110293 A1 | 4/2014 | Dunn et al. | |

OTHER PUBLICATIONS

Written Opinion of the International Searching Authority; International Searching Authority; International Application No. PCT/US21/49812; Dec. 14, 2021; 6 pages.

* cited by examiner

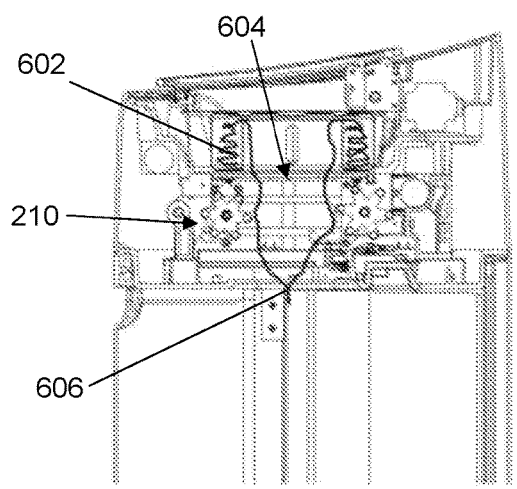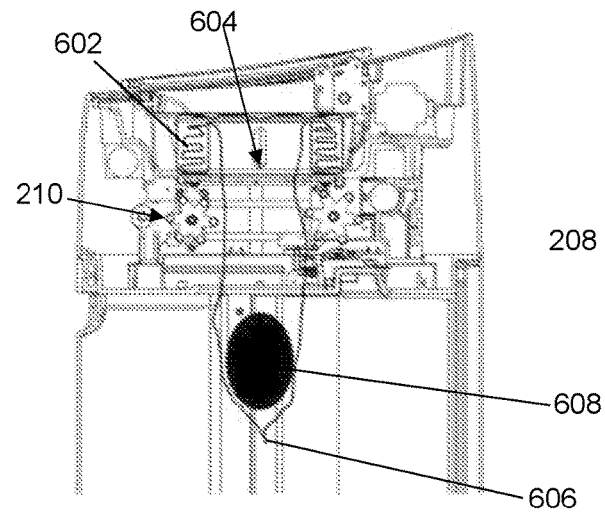
Fig. 17a　　　　　　　　　　Fig. 17b
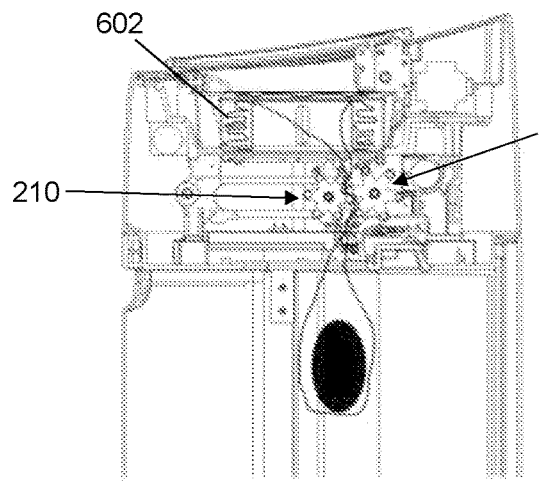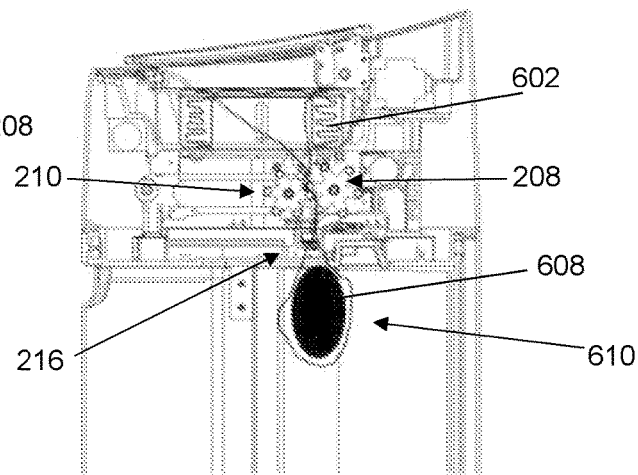
Fig. 17c　　　　　　　　　　Fig. 17d

WASTE MANAGEMENT AND STORAGE APPARATUS AND METHOD

CROSS-REFERENCE TO RELATED APPLICATION

The present disclosure is a U.S. National Phase Entry of PCT/US2021/049812 filed Sep. 10, 2021 and claims the benefit of U.S. Provisional Application No. 63/076,594 filed Sep. 10, 2020, the contents of which are incorporated herein by reference in entirety.

FIELD OF THE DISCLOSURE

The present disclosure relates to a waste management system and more particularly to a waste management system that isolates and packages waste in a sealed chamber.

BACKGROUND

Common waste management systems, such as trash cans or containers, typically use a bagged liner having an open end to provide a chamber for users to deposit waste. In the typical waste management system, the bagged liner remains substantially open on one end. Some waste management systems utilize a lid or the like on top of the trash can or container to try to contain any odors or debris that may be within the bagged chamber. However, since one end of the bagged chamber remains substantially open until the bagged liner is removed, the typical waste management system is not capable of substantially preventing foul odors or the like from radiating from debris within the bagged liner.

As such, there is a need for a waste management system that is capable of efficiently sealing refuse within a chamber at substantially the same time the refuse is deposited therein.

SUMMARY

This disclosure seeks to improve the consumer experience around handling and storing used diapers or other refuse items such as hygiene products, medical supplies, feminine care products, pet waste, food waste, and other materials needing proper containment among any other odorous or hazardous refuse. The system will individually seal refuse items to contain smell and debris, avoiding potential environmental and hygienic hazards. Compared to existing products, this sealing process will be easy to use, the overall design will offer a smaller and more aesthetically appealing form factor, and the product will offer a variety of set up and storage options.

In one non-exclusive embodiment, the product may use a shirred tube of film to create bags. The end of the tube may be factory sealed from the first bag. The device will use sensors to determine the fill of the bag and where to seal the top. Sensors may also be used for safety.

The top of the bag may be sealed using heat sealing or other known sealing methods. This seal will form the top closure of the filled bag and the bottom closure of the next bag. The device may have a method for cutting the filled bag from the subsequent bag.

The product may plug into the wall to receive power for all functions from a battery among other power configurations.

One embodiment is a method for sealing refuse in a sealed chamber. The method includes providing an opening to deposit refuse into a chamber formed of a material that is partially sealed, identifying when refuse is deposited into the partially sealed chamber, activating a sealing assembly after refuse is deposited into the chamber to seal the refuse in the chamber defined by the material, executing a cutting procedure to separate the sealed chamber from the remaining material, the cutting procedure creating a second chamber being formed by partially sealed material, and drawing a length of the material from a reservoir containing tubular shirred material with an extraction assembly.

One example of this embodiment includes selectively positioning a lid over the opening. Another example includes using a controller to identify when refuse is deposited into the partially sealed chamber, activate the sealing assembly, executing the cutting procedure, and engaging the extraction assembly. In yet another example, the sealing assembly both seals the refuse in the chamber and executes the cutting procedure by applying heat to the material. In another example, the sealing assembly rotates a pivoting arm to selectively press material against a heating element to seal the refuse in the chamber.

In yet another example of this embodiment, the extraction assembly comprises a first roller and a second roller configure to selectively rotate to draw a length of material from the reservoir. In this example, the second roller is slidable between an adjacent position wherein the second roller is substantially adjacent to, and rotates with, the first roller, and a spaced position wherein the second roller is spaced from the first roller to allow refuse to pass there between. In one part of this example, the first and second roller each contain at least one interlocking end that allows the first roller to rotationally drive the second roller when in the adjacent position and the first roller is rotated by a motor. In another part of this example, the first and second roller each have a plurality of cross-tubes extending between a first end and a second end.

In yet another example of this embodiment, the extraction assembly has a first arm and a second arm, wherein the first and second arm are substantially parallel to one another and movable between a spaced configuration and an adjacent configuration. In part of this example, the sealing assembly is positioned in one or both of the first arm and the second arm. In another part of this example, when refuse is identified in the partially sealed chamber, the first arm and second arm move to the adjacent configuration and the sealing assembly seals the refuse in the chamber. In yet another part of this example, the first and second arm move to a lowered position while in the adjacent configurations to draw a length of material from the reservoir.

Yet another example of this embodiment includes executing a chamber minimizing process prior to activating the sealing assembly to ensure the chamber containing the refuse is reduced prior to sealing. In yet another example, the identifying, activating, executing, and drawing steps are automatically implemented without additional user interaction.

Another embodiment of this disclosure is a refuse sealing assembly that has an opening selectively covered by a lid and configured to receive refuse there through, an annular reservoir defined around the opening and configured to receive a cartridge containing a shirred material, an extraction assembly configured to selectively draw a length of a material from the cartridge in the annular reservoir, and a sealing assembly configured to selectively seal the shirred material with refuse positioned therein. In this embodiment, the extraction assembly draws material from the cartridge to provide a partially sealed chamber for refuse to be positioned within through the opening. Further, when refuse is positioned within the partially sealed chamber, the sealing assembly seals the chamber to substantially seal the refuse therein.

In one example of this embodiment, the extraction assembly has a first roller and a second roller configure to selectively rotate to draw a length of material from the reservoir. In part of this example, the second roller is slidable between an adjacent position wherein the second roller is substantially adjacent to, and rotates with, the first roller, and a spaced position wherein the second roller is spaced from the first roller to allow refuse to pass there between. In one aspect of this part, the first and second roller each contain at least one interlocking end that allows the first roller to rotationally drive the second roller when in the adjacent position and the first roller is rotated by a motor.

In yet another example of this embodiment, the extraction assembly comprises a first arm and a second arm, wherein the first and second arm are substantially parallel to one another and movable between a spaced configuration and an adjacent configuration and the sealing assembly is positioned in one or both of the first arm and the second arm, and the first and second arm move to a lowered position while in the adjacent configurations to draw a length of material from the reservoir.

DRAWINGS

The above-mentioned aspects of the present disclosure and the manner of obtaining them will become more apparent and the disclosure itself will be better understood by reference to the following drawings.

Figure 1:
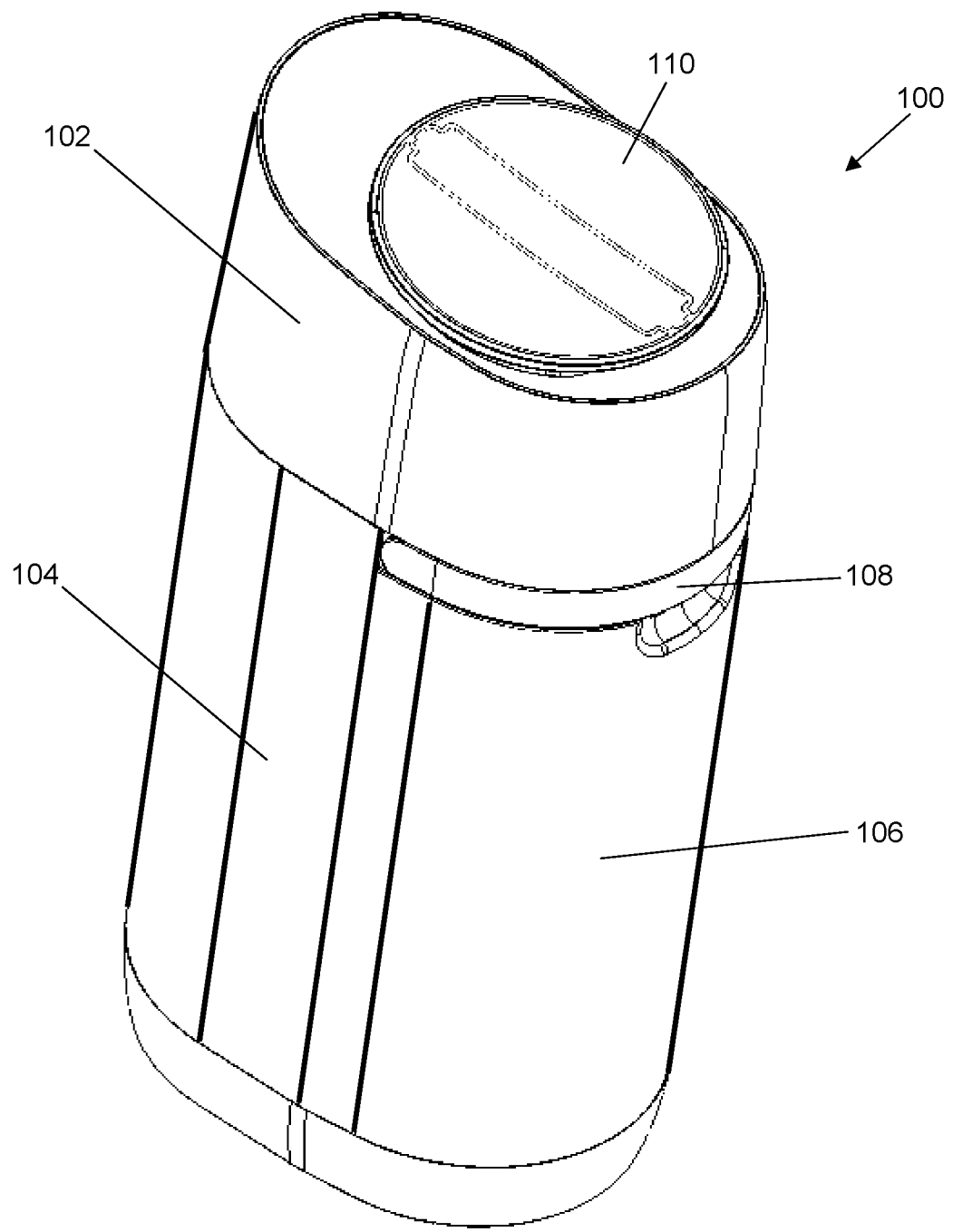
FIG. 1 is an elevated perspective view of one embodiment of a refuse sealing assembly.
Figure 2:
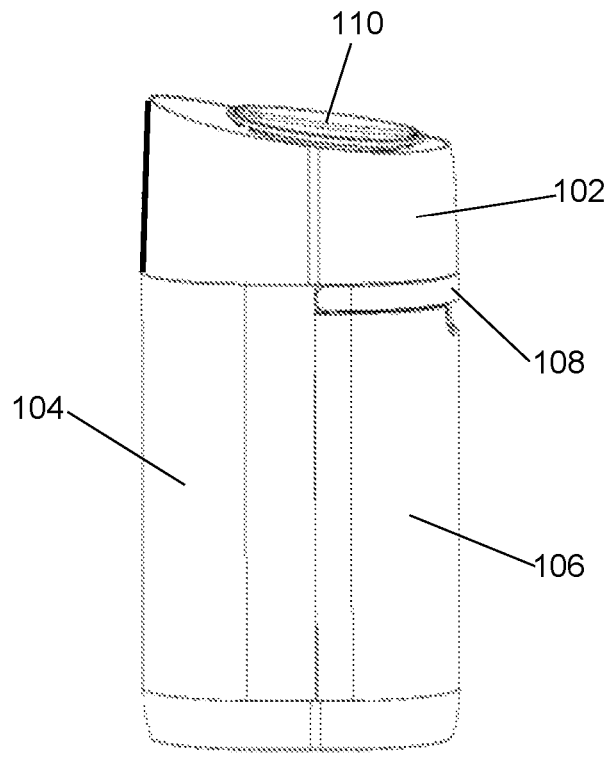
FIG. 2 is a left side view of the refuse sealing assembly of FIG. 1.
Figure 3:
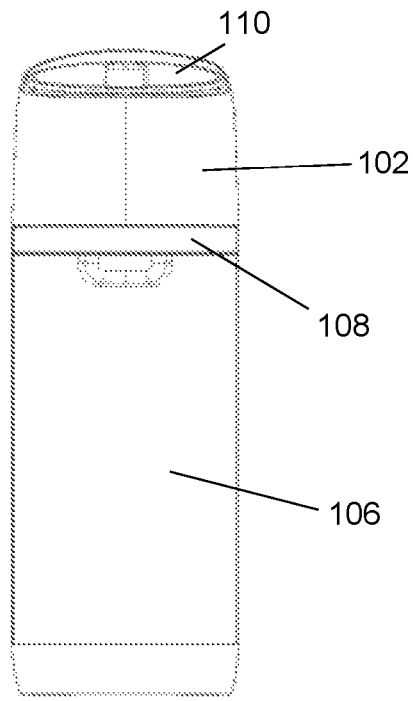
FIG. 3 is a front view of the refuse sealing assembly of FIG. 1.
Figure 4:
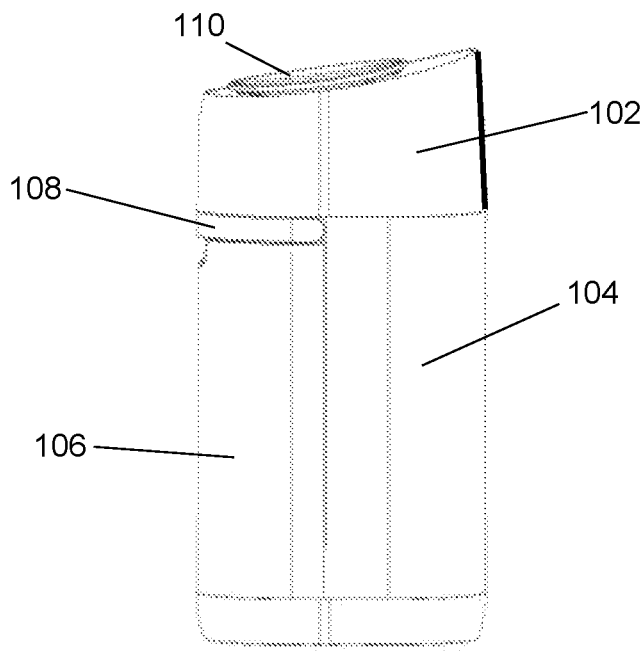
FIG. 4 is a right side view of the refuse sealing assembly of FIG. 1.
Figure 5:
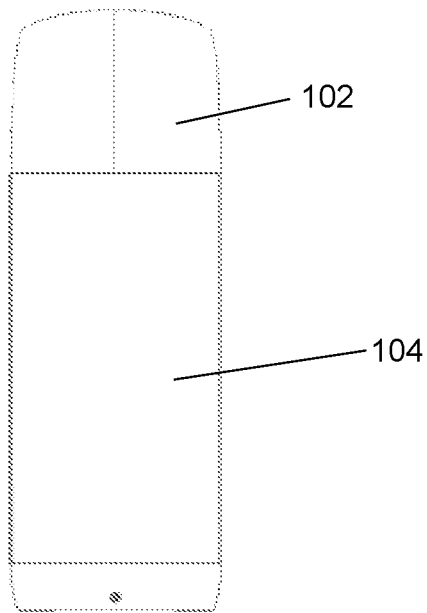
FIG. 5 is a back view of the refuse sealing assembly of FIG. 1.
Figure 6:
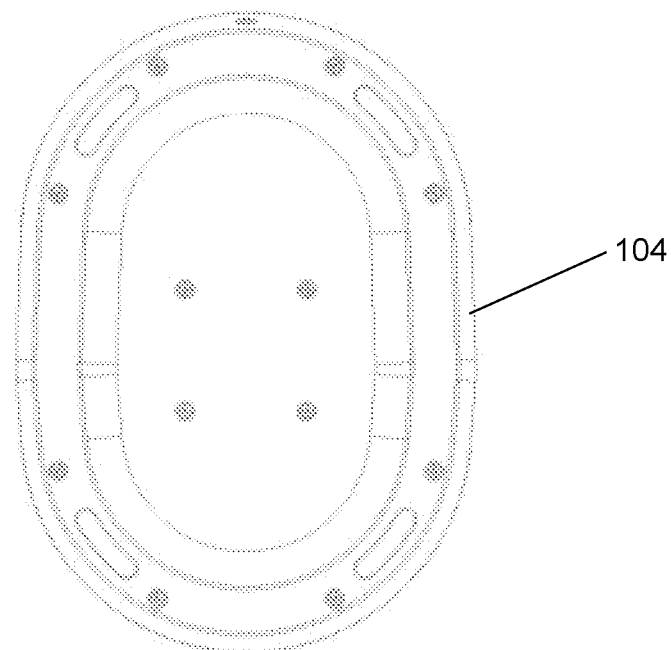
FIG. 6 is a bottom view of the refuse sealing assembly of FIG. 1.
Figure 7:
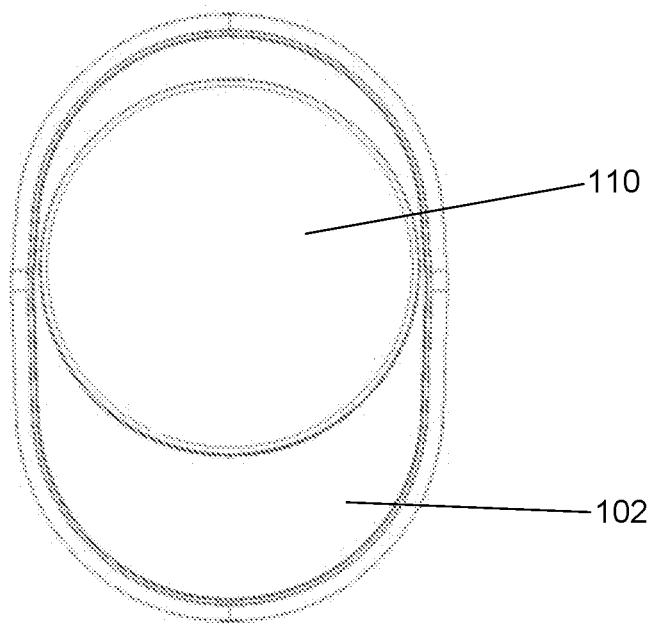
FIG. 7 is a top view of the refuse sealing assembly of FIG. 1.
Figure 19:
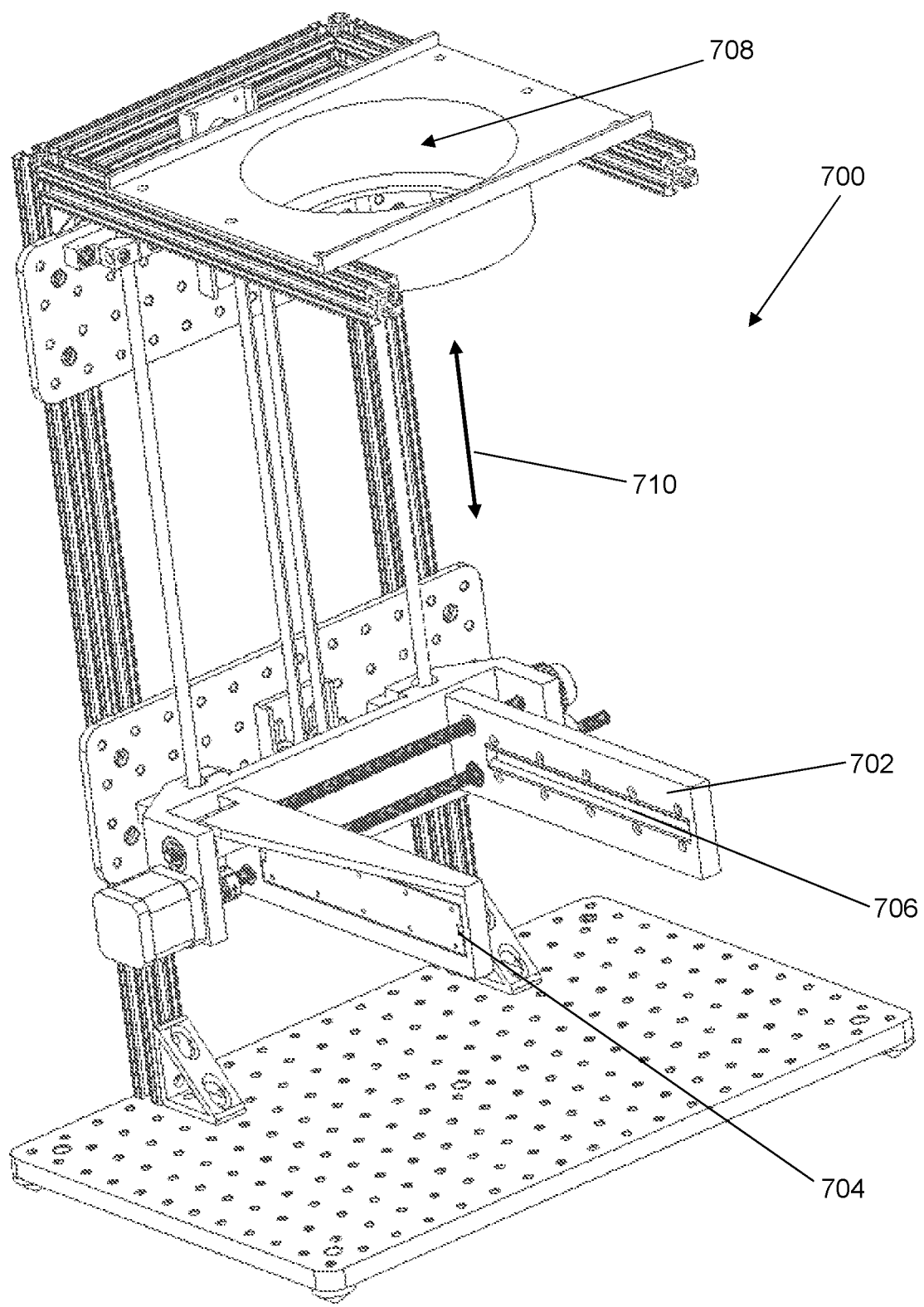

FIGS. 17*a*-17*c* are section side views of the refuse sealing assembly of FIG. 1 during different stages of operation;

FIGS. 18*a*-18*d* are elevated perspective views of a partial section of the refuse sealing assembly of FIG. 1; and FIG. 19 is an elevated perspective view of another embodiment of an extraction assembly for a refuse sealing assembly.

Corresponding reference numerals indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

In one non-exclusive embodiment, the form factor may be as small as reasonably possible. The device may have a lid. However, other embodiments considered herein may not have a lid. When the lid is lifted a used diaper or other refuse item may be inserted into the receiving aperture. The receiving aperture may be large enough to accommodate multiple sizes of diapers or other refuse items. The device may have an opening to insert the packaged film/bags and an opening to remove sealed diapers from the system. The smallest version of the device may not have any substantial storage capacity and once the sealed product is processed it will be positioned to be removed and discarded at a separate location. In yet another embodiment, an internal compartment may allow internal storage for one or more sealed diaper at a time. The system may have auxiliary storage to hold up to a week of diapers. The form factor will allow for easy cleaning.

The device may perform multiple functions, including sealing, cutting, and automatic bag advancement. The device may use multiple linear motion systems. One embodiment may be a system that allows motion of a platform up and down inside the enclosure, relative to the bag. This motion may allow for the advancement of the bags and flexibility in the height of the top seal relative to the bottom seal.

In one embodiment of this disclosure, there may be a system that allows for the sealing surfaces to be clamped together. This could be two surfaces coming together along the center line of the device or a single surface translating to meet a fixed surface on one side of the device. There may also be a system to allow for a translating blade for separating the bags.

Motion may be achieved using motion control components and principles. Each axis may have a guide and a drive mechanism. The guide may be plastic or metal rails that allow a carriage to move along. The drive may consist of a motor and a transmission. The transmission may be a lead screw or belt and include one or more gears.

The product may use a plastic film to create bags to contain refuse. The film may be a laminate of multiple layers and materials. In one non-exclusive example, the plastic film may be packaged in a cartridge that is received by the product. However, other embodiments may not use a cartridge at all.

Each layer may impart specific features, including odor barrier, moisture barrier, germ barrier, structure, and sealing among others. The laminate film may be a unique recipe. The film may be converted from flat material into tubes. The tubes may be shirred over a mandrel to allow for more material to be stored. The shirred film may be stored in a container or other location.

The bag material may be housed in the upper part of the device. This may allow for bags to be pulled down into the device in preparation for filling. The bag material may have a circular or rounded rectangular shape. This shape may align with the insertion aperture in the top of the device. Bag material may be inserted manually by the user from the top or side of the device.

The tube of film may be sealed at the top and bottom to form a closed bag when refuse is positioned therein. The seal may be created by melting the sealing layers of the film and letting them cool under pressure to form a bond. The heat to melt the film may be created by an impulse heater. For example, a high resistance wire may be provided a current to thereby heat the wire. This wire may be protected and heat may be diffused by other pieces of plastic or metal. This sealing method provides flexibility and addresses safety. However, other sealing methods are also contemplated herein.

After the bag has been filled and the top sealed, the bag may be separated from the tube of film. This may be accomplished with an automated blade that may travel transversely to the tube cutting between the top seal of the filled bag and the bottom seal of the subsequent bag. Alternatively, a secondary heater wire (or the primary heater wire) could be configured to melt entirely through the film between the top seal of the filled bag and the bottom seal of the subsequent bag. However, other forms of separation are also considered herein.

Following sealing and cutting of the filled bag, the subsequent bag may need to be advanced into position for filling. The components may be used to clamp the bottom of the bag between two surfaces, holding it firmly. The components may then pull the bag down. Once enough material has been pulled out, the components may unclamp the device.

The device may use sensors to collect data that drives the motion components and automatic functions. Sensing needs include, but are not limited to sensing if the lid is open or closed, sensing if the bag has been filled, sensing where the top seal needs to be made, sensing if the bag has been fully separated from the subsequent bag, and sensing when diaper storage is full. These sensor may be any type of sensor known in the art capable of identifying the desired status.

The device of this disclosure may have accessories to increase refuse storage and allow for multiple mounted or free-standing configurations. This device may establish a platform of motion control and sealing that can be used in future products to seal pet waste, adult incontinence products, feminine care products, and food waste among other things.

Figure 8:
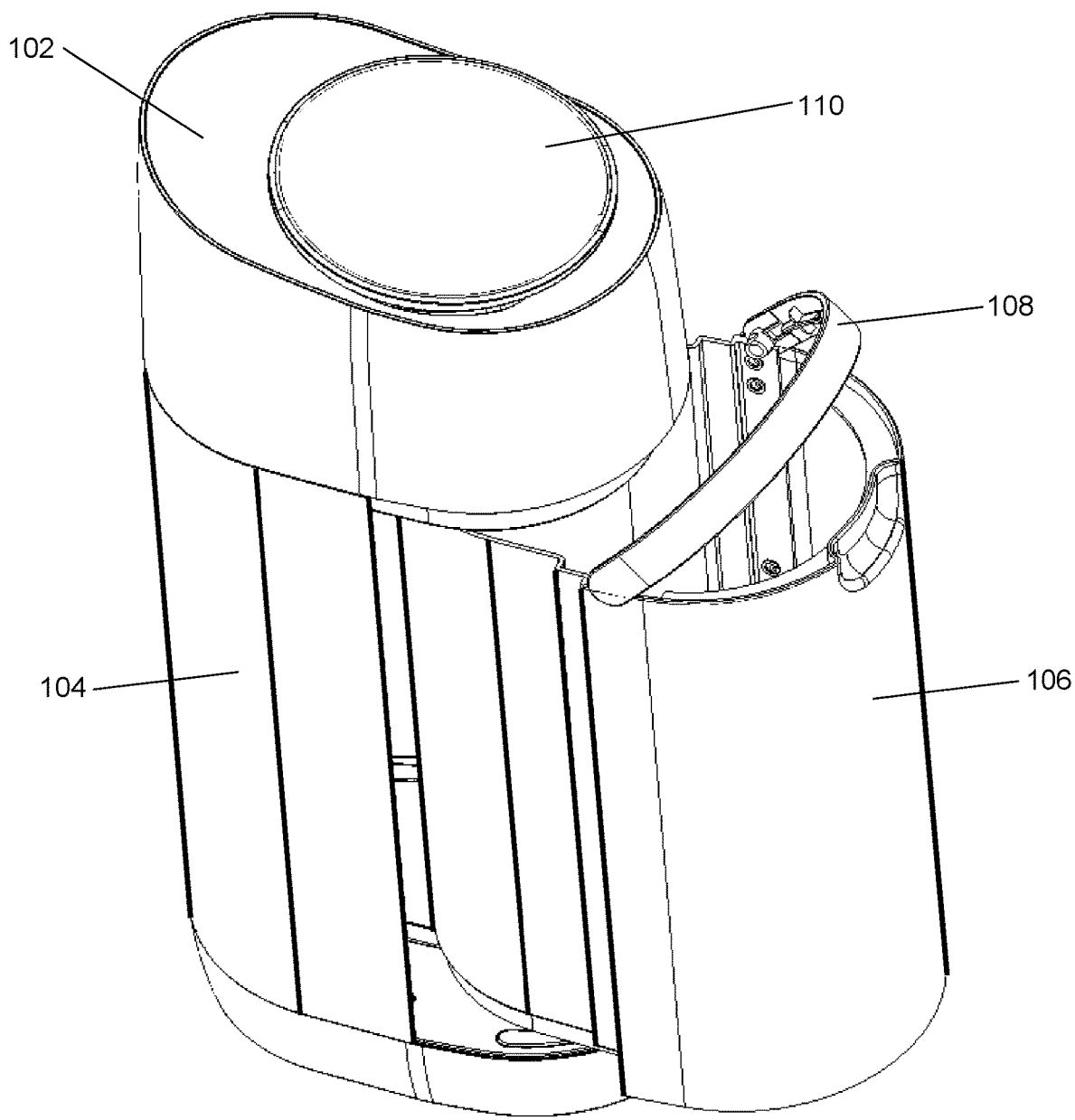
FIG. 8 is an elevated perspective view of the refuse sealing assembly of FIG. 1 with a removable bin partially removed therefrom.
Figure 9:
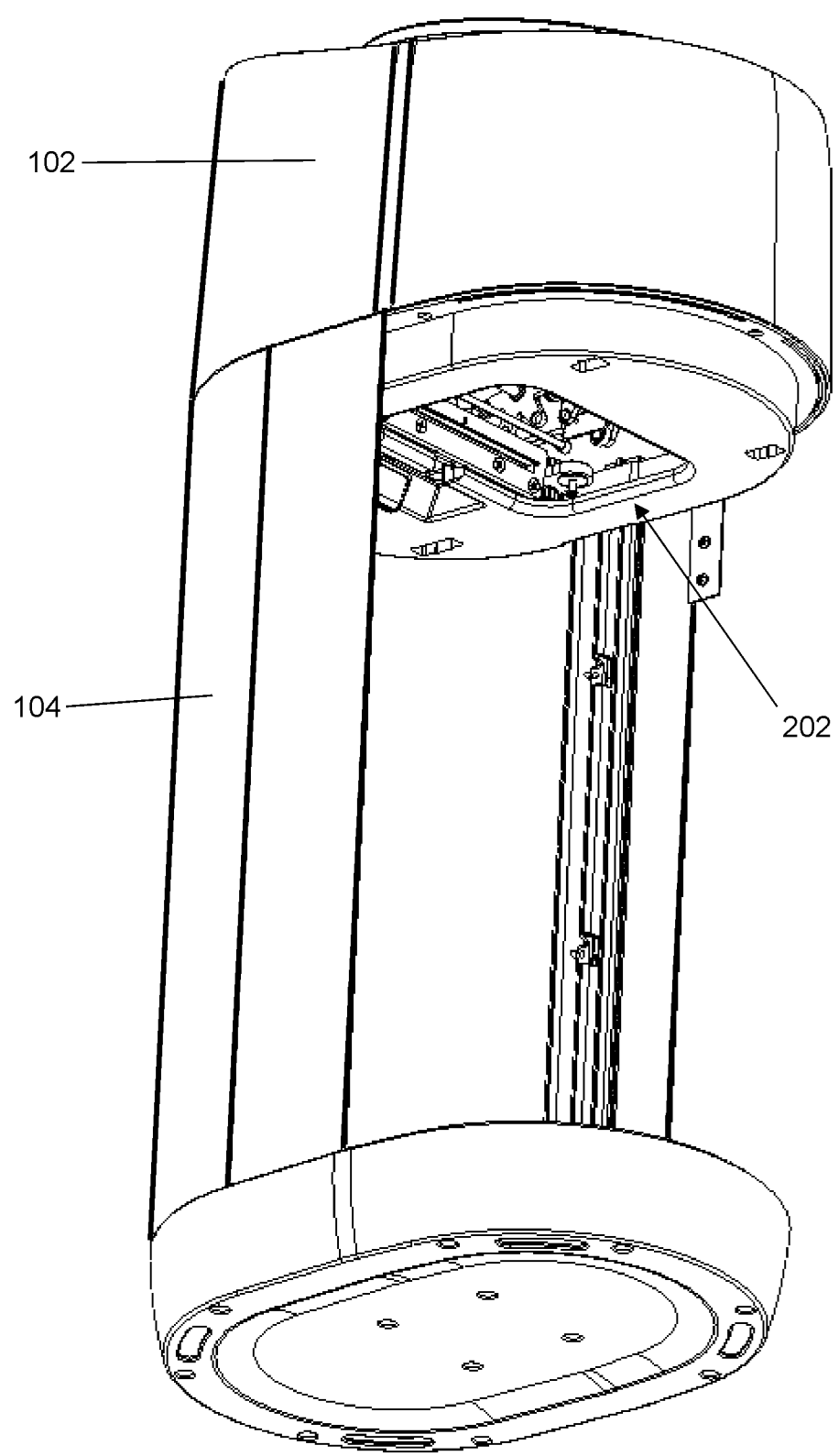
FIG. 9 is lowered perspective view of the refuse sealing assembly of FIG. 1 with the removable bin removed.

Referring now to FIG. 1, one specific embodiment of a refuse sealing assembly 100 is illustrated. The assembly 100 may have a top portion 102 and a bottom portion 104. The top portion 102 may house many of the electronic components and other material discussed herein while the bottom portion 104 may contain a removable bin 106 among other things. The bin 106 may be selectively removable from the bottom portion 104 to discard any waste therein (see FIG. 8). In one aspect of this disclosure, the bin 106 may have a handle 108 that is pivotal relative to the bin 106 to facilitate easy removable from the bottom portion 104 and dumping of any waste within the bin 106.

Figure 10:
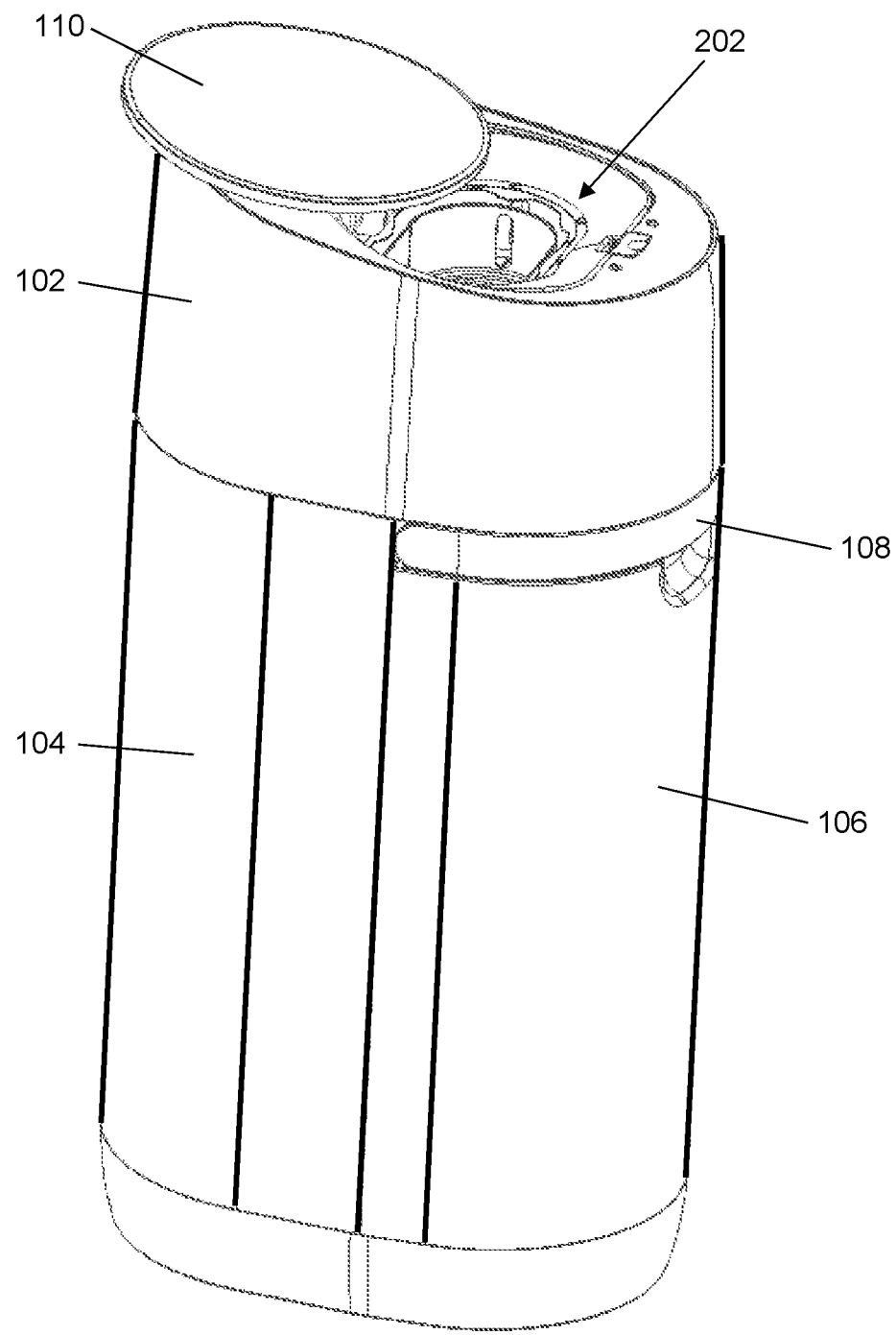
FIG. 10 is an elevated perspective view of the refuse sealing assembly of FIG. 1 with a lid in the opened position.

The top portion 102 may have a lid 110 that is selectively positionable over an opening 202 (see FIG. 10) in the top portion 102. The lid 110 may be electronically repositioned with one or more electric motor or the lid 110 may be manually moved between a closed position (as illustrated in FIG. 1) wherein the opening 202 is covered by the lid 110 and an opened position (as illustrated in FIG. 10) wherein the lid 110 does not substantially cover the opening 202. In one aspect of this disclosure, when the lid 110 is manually transitioned to the opened position, the lid 110 is held in the opened position with a catch or the like so a user can deposit waste through the opening 202. Further still, one embodiment contemplated herein may not have a lid at all. Rather, the opening in the top portion 102 may never be substantially covered.

Figure 11:
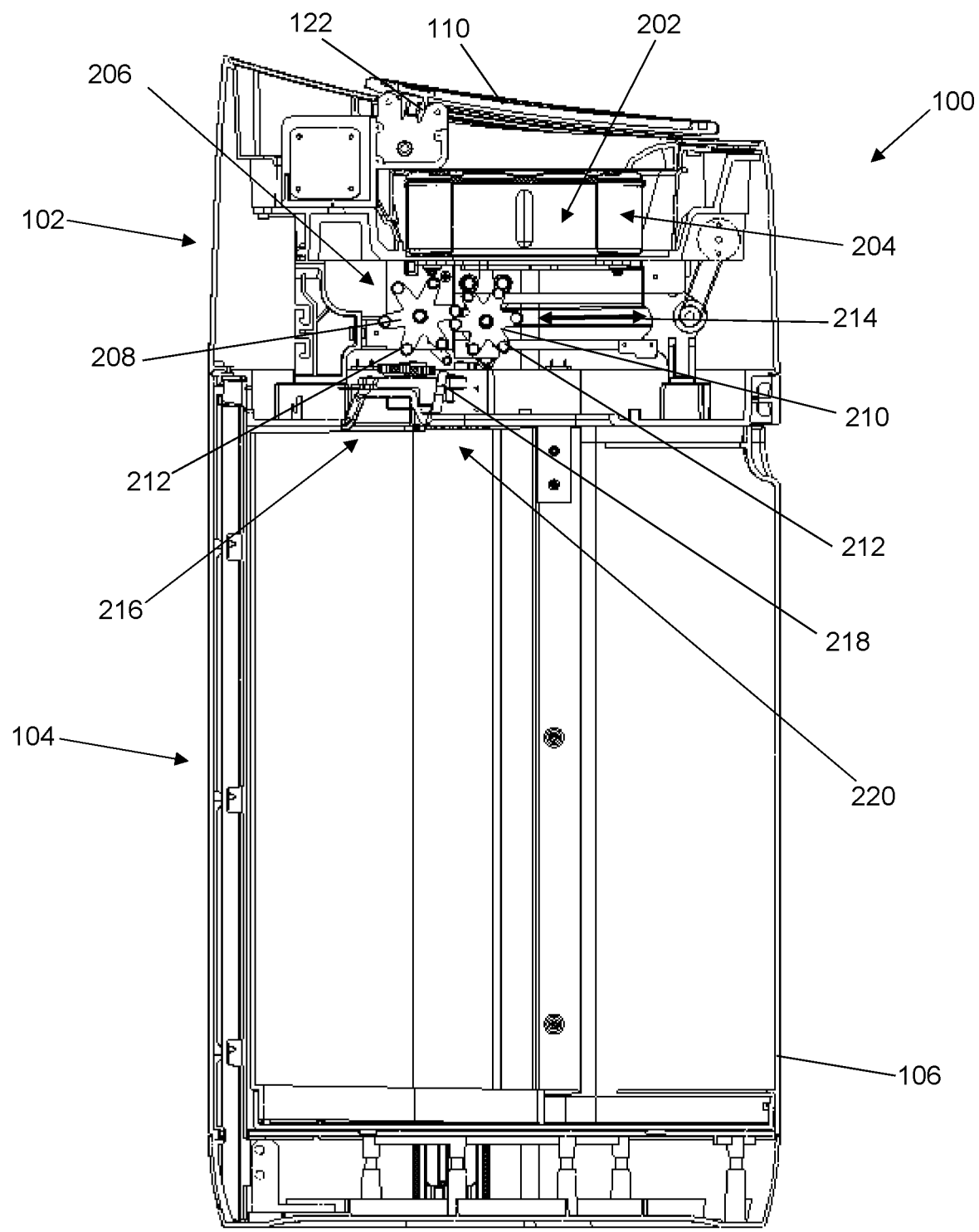
FIG. 11 is a section view of the refuse sealing assembly of FIG. 1.
Figure 12:
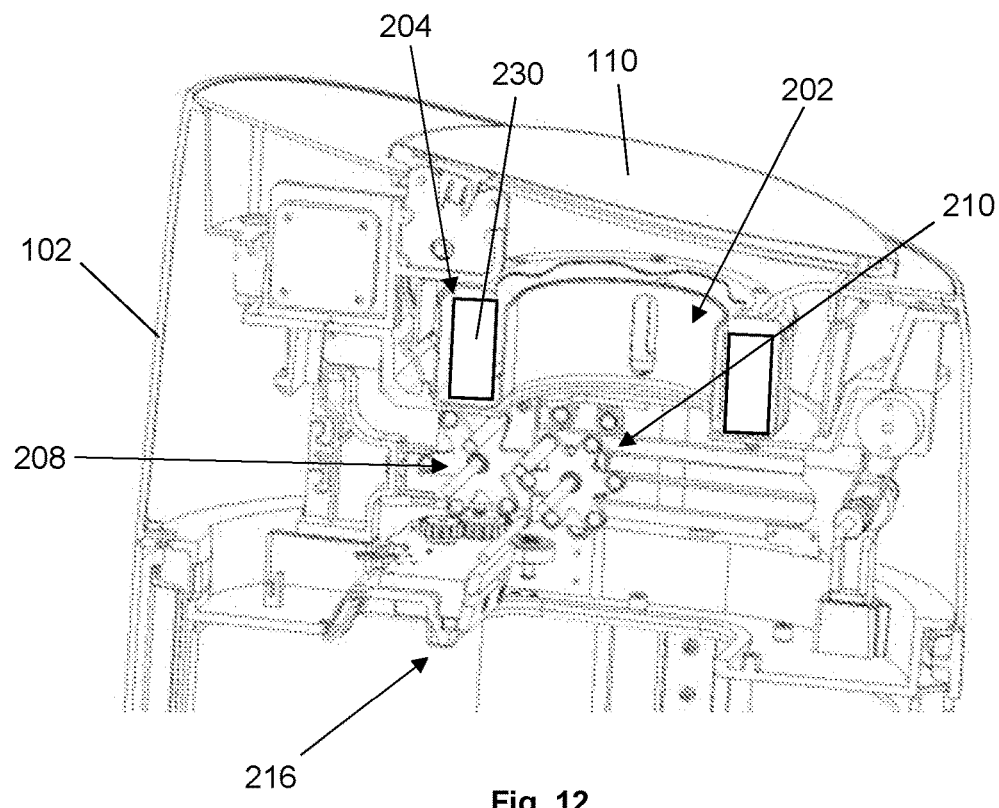
FIG. 12 is a partial section view of the refuse sealing assembly of FIG. 1 from a left side perspective.
Figure 13:
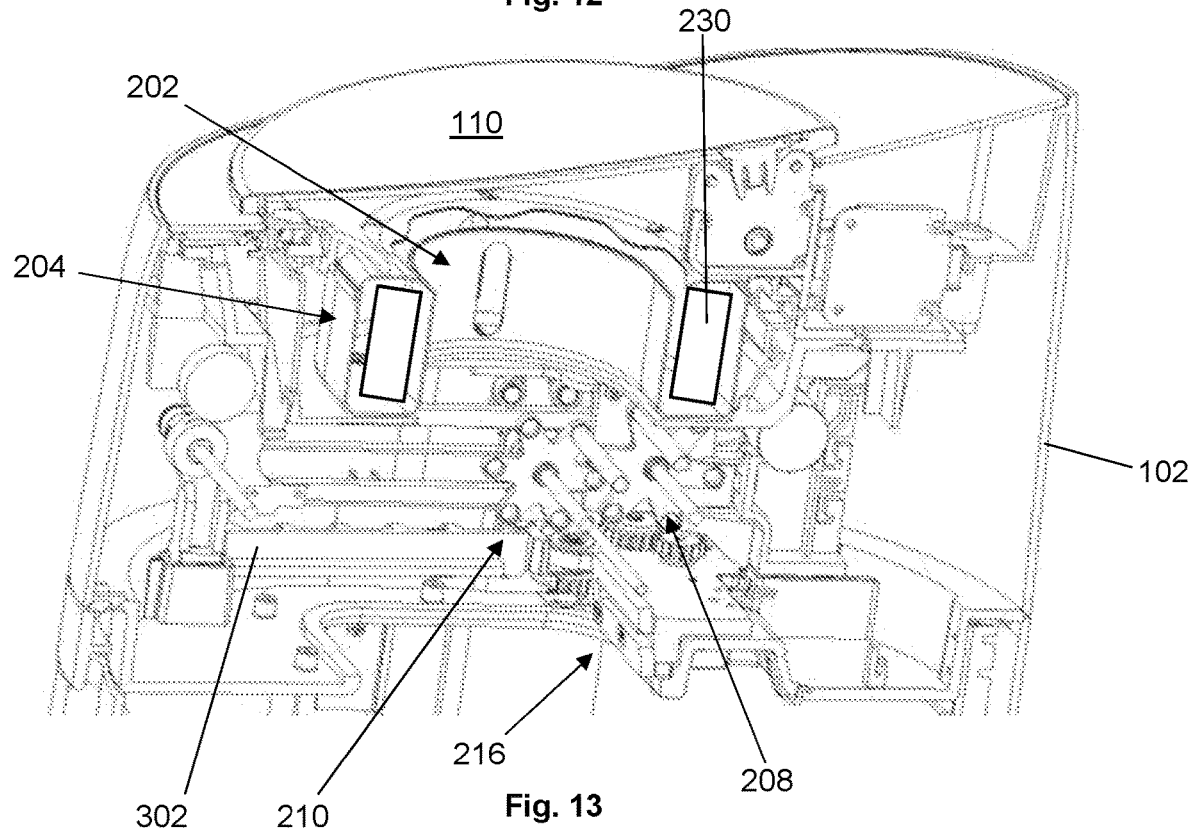
FIG. 13 is a partial section view of the refuse sealing assembly of FIG. 1 from a right side perspective.

Referring now to FIG. 11, a section view of the refuse sealing assembly 100 is shown. The assembly 100 has the opening 202 positioned underneath the lid 110 when the lid 110 is in the closed position. The opening 202 may be surrounded by a substantially annular reservoir 204 that may be selectively filled with a cartridge 230 containing a shined material (see FIGS. 12 and 13). The cartridge 230 of shirred material may be disposable such that once a substantial amount of the shirred material in the cartridge 230 is used, the cartridge 230 may be removed from the annular reservoir 204 and a new cartridge filled with shirred material may be placed therein.

Underneath the opening 202 may be an extraction assembly 206 configured to selectively pull shirred material from the cartridge 230 when the cartridge 230 is positioned within the reservoir 204. The extraction assembly 206 may have a first roller 208 and a second roller 210 configured to selectively engage one another to pull material therebetween. The first and second roller 208, 210 may each have a plurality of cross-tubes 212 at distal portions of radial arms of the rollers 208, 210. In the configuration illustrated in FIG. 11, the rollers 208, 210 are interlocked along the ends such that rotation of the first roller 208 engages, and rotates, the second roller 210, similar to intermeshed gears. In the example illustrated in FIG. 11, each roller 208, 210 may have six radial arms, each radial arm having a cross-tube 212 at the terminus. However, other configurations having more than six radial arms and cross-tubes 212 and less than six radial arms and cross-tubes 212 are also contemplated herein.

The second roller 210 may be selectively movable in a linear direction 214 away from the first roller 208. The second roller 210 may be moved away from the first roller 208 when the partially sealed bag is positioned therebetween as will be discussed in more detail here. Further, the second roller 210 may be spaced from the first roller 208 in order to provide sufficient space through the opening 202 to deposit refuse within a partially sealed chamber formed by the shirred material from the cartridge 230 in the reservoir 204.

The top section 102 may also have a sealing assembly 216 therein. The sealing assembly 216 may have a heating element 218 positioned therein and configured to be selectively heated to seal any shined material adjacent to the heating element 218. A cutting assembly 220 may also be positioned in the top section 102. The cutting assembly 220 may be configured to separate a sealed bag with refuse therein from the remaining material from the reservoir. The cutting assembly 220 may utilize a cutting device such as a blade. However, in one embodiment of this disclosure, the heating element 218 may also be configured to act as the cutting assembly 220 by being heated sufficiently to seal and separate the material surrounding the refuse. In this configuration, the sealing assembly 216 substantially simultaneously seals and separates shined material positioned therein as described in more detail below.

Figure 14:
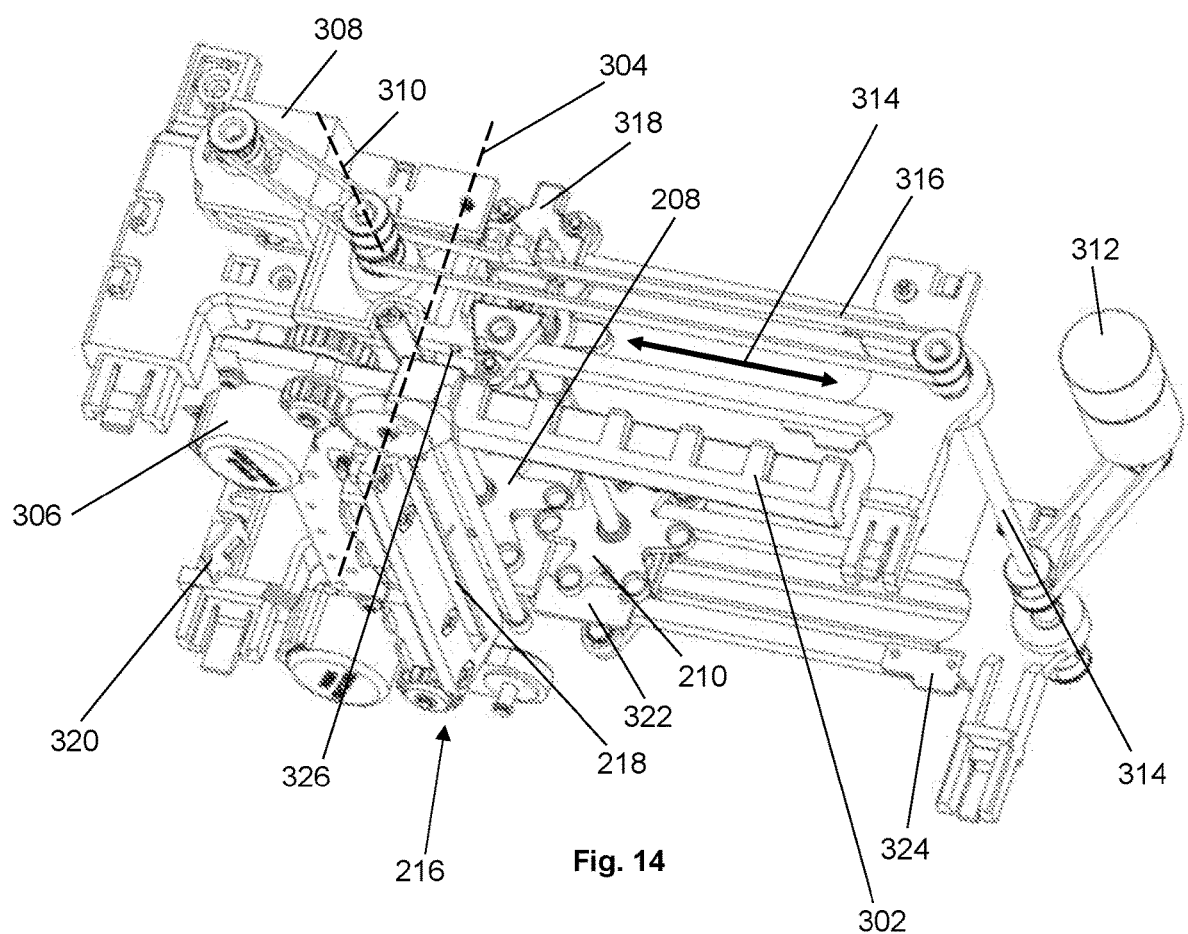
FIG. 14 is a partial view of internal components of the refuse sealing assembly of FIG. 1 with a housing removed.

Referring now to FIG. 14, an isolated view of some of the components of the top portion 102 is shown. More specifically, FIG. 14 illustrates a pivoting arm 302 that is positioned to selectively pivot about an axis 304 to transition between an opened position illustrated in FIG. 14 and a closed position wherein the pivoting arm 302 is positioned substantially adjacent to the heating element 218. The pivoting arm 302 may be selectively positioned in adjacent to the heating element 218 to press any material there between into the heating element 218 to promote sealing and/or cutting. The pivoting arm 302 may be powered by one or more pivot motor 306 through a gear assembly. Alternatively, the pivot motor 306 may directly pivot the pivoting arm 302.

In another aspect of this disclosure, a roller motor 308 may selectively rotate the first roller 208. The roller motor 308 may be rotationally coupled to the first roller 208 through a belt or the like and selectively rotate the first roller 208 about a roller axis 310. Further, the roller motor 308 may power the second roller 210 when the second roller 210 is positioned adjacent to, and interconnected with, the first roller 208 as illustrated in FIG. 14. Note, however, that FIG. 14 does not illustrate the cross-tubes 212 to enhance visibility of the remaining components. However, in a typical configuration a cross-tube 212 would extend from the terminus of each radial arm of the rollers 208, 210.

As mentioned herein, the second roller 210 may provide for linear movement 214 relative to the first roller 208. In one aspect of this disclosure, the linear movement of the second roller 210 may be provided via a slider motor 312. The slider motor 312 may be rotationally coupled to a rotating rod 314 via belts, chains, or the like. When the slider motor 312 is powered, rotation of the motor rotates the rotating rod 314. Further, the terminal ends of the rotating rod 314 may contain pulleys, sprockets, or the like to further translate the rotary motion of the rotating rod 314 to move a slider belt 316 on either side of the second roller 210. The slider belt 316 may rap around an idler pulley, sprocket, or the like at the roller axis 310 and have both ends coupled to a carriage 318 on either side of the second roller 210. The carriages 318 may be configured to slide along rails in the linear direction 314 when engaged by the slider motor 312.

In other words, the slider motor 312 may selectively rotate the rod 314 to thereby move the ends of the slider belts 316 and the corresponding carriages 318 in the linear direction 314. As such, the slider motor 312 can selectively slide the second roller 210 into, and out of, engagement with the first roller 208. Further, the carriages 318 may have bearings, bushings, or the like that allow the second roller 210 to rotate relative to the carriages 318 regardless of their movement in the linear direction 314. That is to say, the second roller 210 is free to rotate about an axis defined through the carriages 318.

In one aspect of this disclosure, a sensor 320 may be positioned underneath the rollers 208, 210. The sensor 320 may be configured to identify the location of debris or refuse within the partially sealed chamber of material extending past the rollers 208, 210. As will be discussed in more detail herein, the rollers 208, 210 may implement as reverse operation prior to sealing refuse within the chamber to minimize material waste. The sensor 320 may communicate with a controller to execute the reverse operation until the refuse in the material is positioned close to the sealing assembly 216 to be sealed. In one aspect of this disclosure, the sensor 320 is an infrared sensor. However, other sensors capable of identifying the location of refuse within the partially sealed chamber of material are also considered herein.

Figure 15:
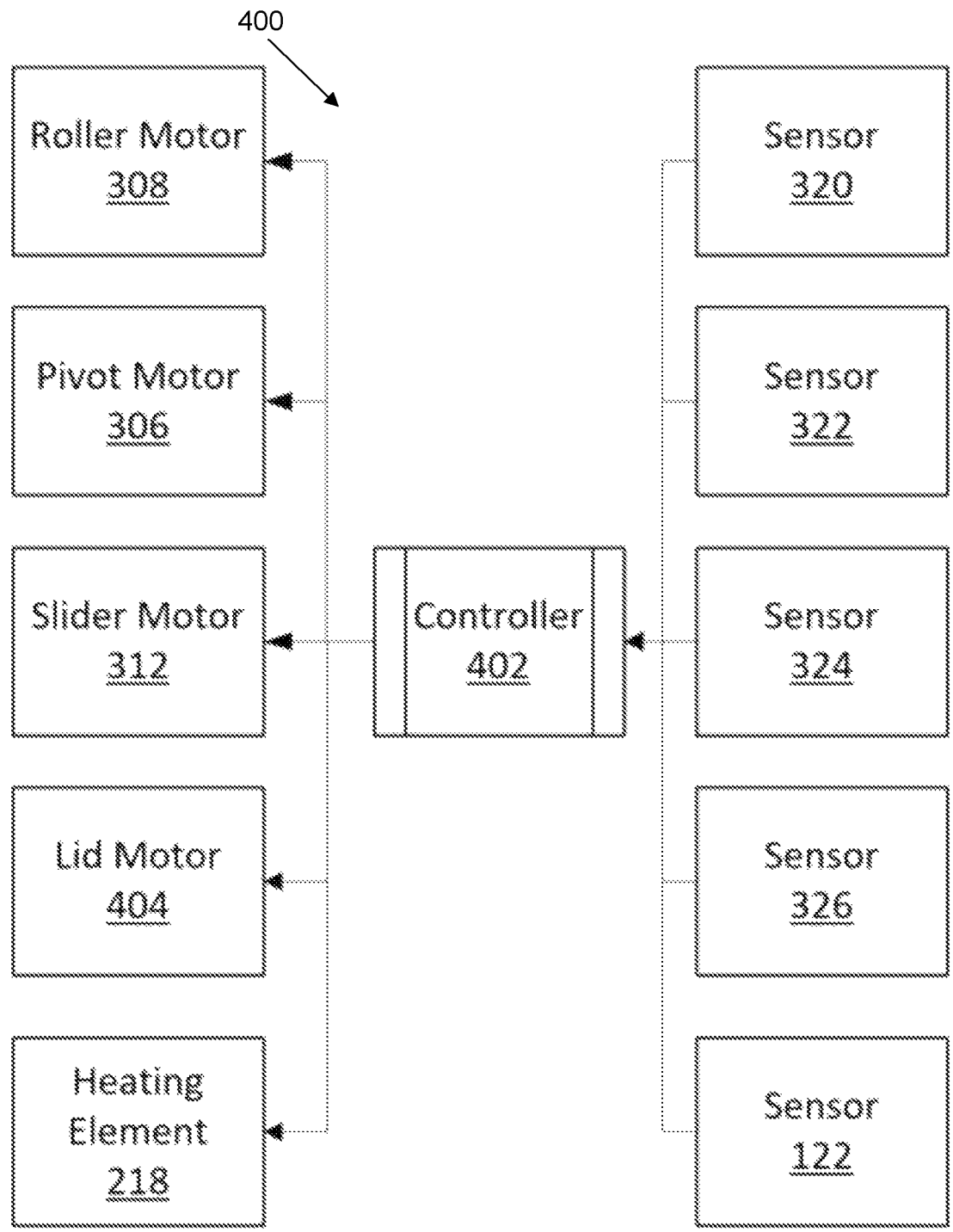
FIG. 15 is a schematic representation of electrical components of the refuse sealing assembly of FIG. 1.

Referring now to FIG. 15, one exemplary schematic of a control system 400 for the refuse sealing assembly 100 is illustrated. More specifically, a controller 402 is illustrated communicating with, or otherwise commanding, components of the refuse sealing assembly 100. The controller 402 may have a memory unit and one or more processor. The memory unit may have algorithms, programs, equations, thresholds, source code, or the like stored thereon and accessed by the processor to execute corresponding commands and analyze data among other things. While a single controller 402 is illustrated, the controller 402 considered herein may include more than one controller, wherein parts of the processes discussed herein may be executed by different controllers. Further, the controller 402 may communication with the components and sensors of the control system 400 using any known wired or wireless communication protocol.

The controller 402 may receive readings from different sensors of the refuse sealing assembly 100. For example, sensor 320 may provide data to the controller 402 regarding the location of refuse below the rollers 208, 210. Sensor 322 may be positioned to provide data to the controller 402 indicating when the second roller 210 is positioned adjacent to the first roller 208. Similarly, sensor 324 may be positioned to provide data to the controller 402 indicating when the second roller 210 is spaced from the first roller 208. Further still, sensor 326 may be positioned to provide data to the controller 402 indicating when the pivoting arm 302 is in an opened position. Sensor 122 may similarly be positioned to provide data to the controller 402 indicating whether the lid 110 is in an opened or closed configuration. The sensors 320, 322, 324, 326, 122 may be any known sensor capable of providing the data considered herein. Sensor 320 may be an infrared sensor in one embodiment. Sensors 322, 324, 326, 122 may be hall effect sensors among others.

The controller 402 may also selectively control the roller motor 308, pivot motor 306, slider motor 312, and a lid motor 404. The roller motor 308 may be selectively controlled by the controller 402 to rotate the first roller 208 (and the second roller 210 when interconnected therewith). The controller 402 may selectively engage the pivot motor 306 to pivot the arm 302 to press material against the heating element 218. The controller 402 may selectively engage the slider motor 312 to move the second roller 210 between the adjacent configuration and the spaced configuration. Further, the controller 402 may selectively engage a lid motor 404 to open and close the lid 110. While specific sensors and motors are discussed herein with regards to the control system 400, this disclosure contemplates using more, or fewer, motors and sensors to implement the teachings discussed herein.

Figure 16:
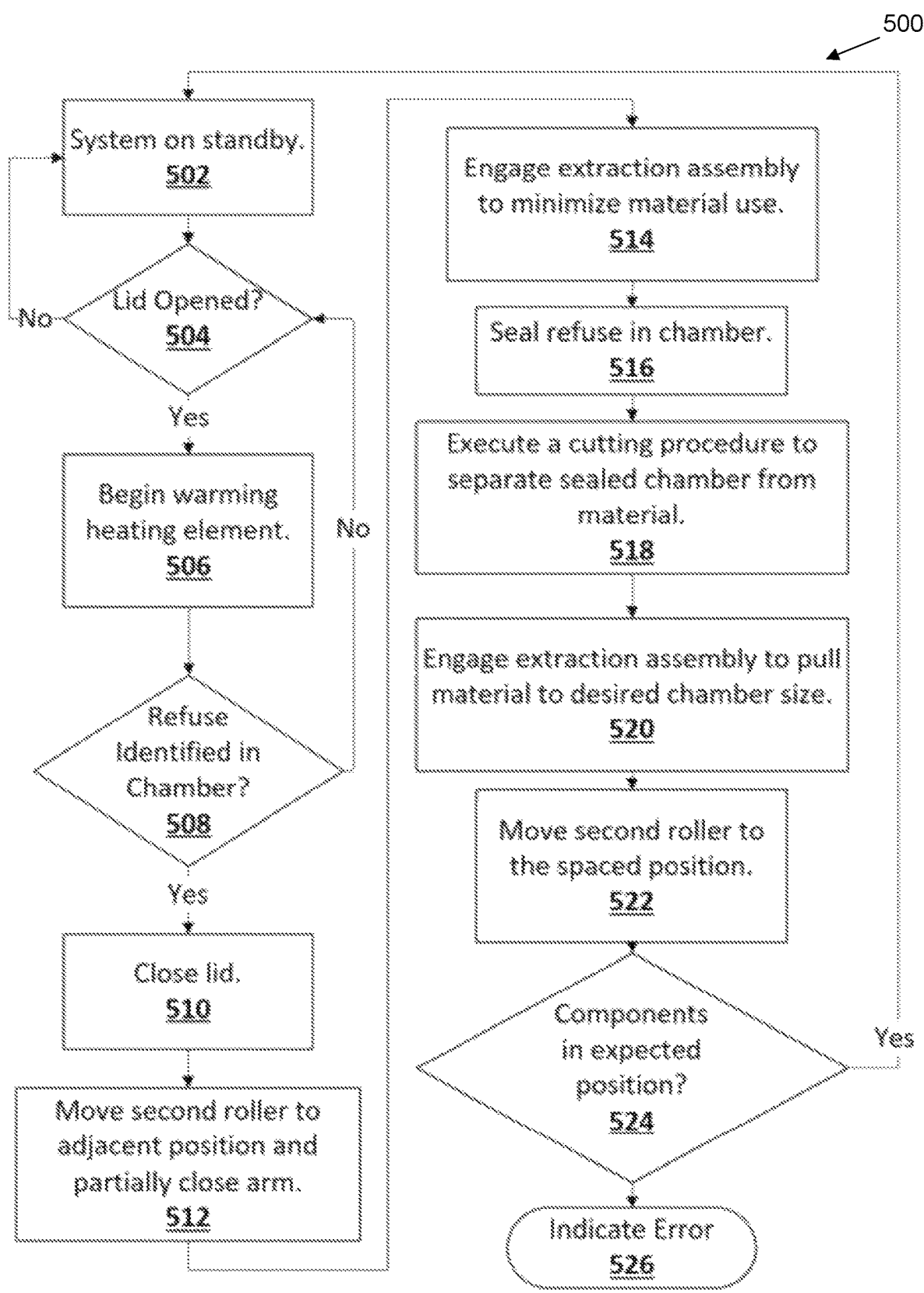
FIG. 16 is a schematic representation of a logic flow chart of the refuse sealing assembly of FIG. 1.
Figure 18A:
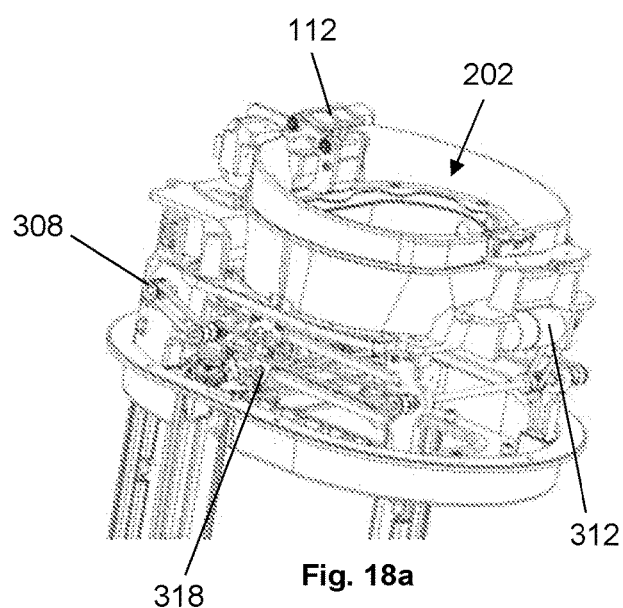
Figure 18B:
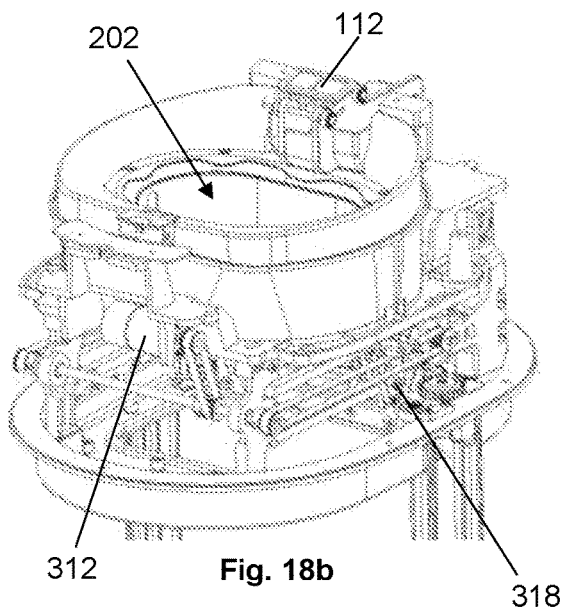
Figure 18C:
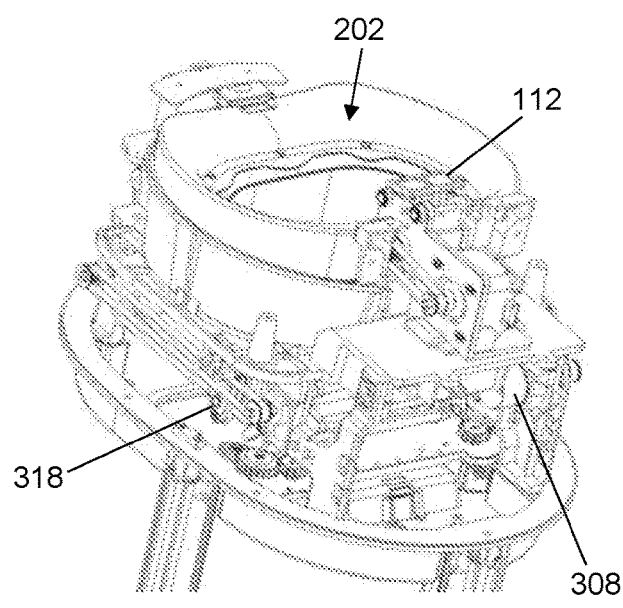
Figure 18D:
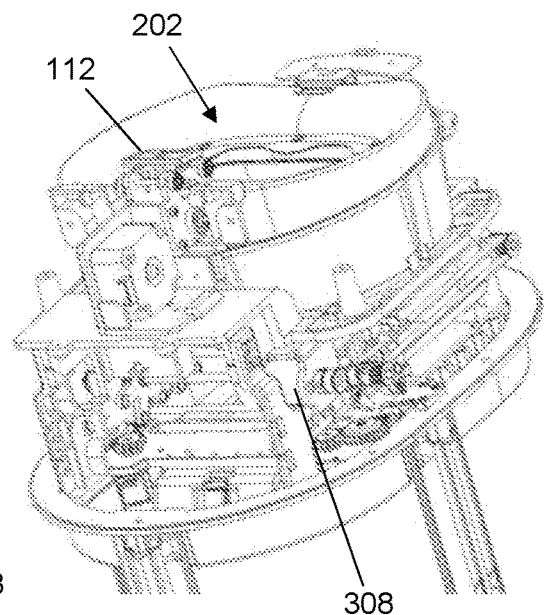

Referring now to FIG. 16, a logic flow chart 500 is illustrated for the refuse sealing assembly 100. The logic flow chart 500 may be executed by the controller 402 or any other system or hardware component capable of executing the recited functions. Initially, the system may be on standby in box 502. Standby may mean that the assembly 100 is powered, either by being connected to a local power grid or by having batteries with a charge, and all components are positioned as expected. In box 504, the controller 402 may consider whether the lid 110 is opened. The controller 402 may identify the lid 110 position via the sensor 122 in box 504. In an alternative embodiment, there may be no lid 110 at all, and box 504 may identify whether a user interface, such as a button, has been engaged. Regardless, if the lid 110 is closed or the user interface is not engaged, the controller 402 may maintain the system in standby.

However, if the lid 110 is opened, or the user interface is engaged, in box 504, the controller 402 may start warming the heating element 218 in box 506. By warming the heating element 218 at this time, the heating element 218 may be at a sufficient temperature to quickly seal the chamber once refuse is positioned therein. Accordingly, in the following box 508, the controller 402 may identify when refuse is placed within the partially sealed chamber. In one example of this embodiment, the controller 402 may utilize sensor 320 to identify when refuse is deposited within the partially sealed chamber. Alternatively, a user interface such as a button may be used to indicate refuse has been deposited in the partially sealed chamber. If refuse is not identified in the partially sealed chamber, the controller 402 may continue to monitor box 504. However, if refuse is identified in the partially sealed chamber, the controller 402 may close the lid 110 in box 510. In embodiments without a lid, box 510 may be skipped.

In box 512, the second roller 210 is moved to be adjacent to the first roller 208 and the arm 302 is moved to a partially closed position. When the arm 302 is in the partially closed position, it may be angled slightly away from the heating element 218 but otherwise positioned to direct the shirred material there between. Next, the controller 402 may engage the extraction assembly 206 to minimize the amount of shirred material required to seal the refuse. In this step, the controller 402 may engage the extraction assembly 206 to pull the partially sealed chamber of material and the refuse therein up towards the extraction assembly 206. The controller 402 may substantially simultaneously monitor sensor 320 to identify when the refuse is substantially close to the sealing assembly 216. In this position, the controller 402 may execute box 516 to seal the refuse in the material while in a configuration that minimizes material waste. In box 516, the controller 402 may fully pivot the arm 302 to be adjacent to the heating element 218 to thereby seal the material above the refuse and create a sealed chamber having the refuse therein while simultaneously creating a partially sealed chamber of material above heating element 218.

In box 518, the controller 402 may execute a cutting procedure to separate the sealed chamber of material with the refuse therein from the remaining shirred material coming from the reservoir 204. The cutting procedure may utilize the heating element 218 to substantially melt the sealed chamber of material from the remaining material of the cartridge 230 in the reservoir 204. Alternatively, a separate cutting assembly 220, such as a cutting blade, may be engaged the by controller 402 in box 518 to cut the sealed chamber of material from the remaining material of the cartridge 230 in the reservoir 204.

After the sealed chamber of material containing the refuse has been cut from the remaining material, a partially sealed chamber is formed by the shirred material from the cartridge 230 in the reservoir 204 and the section sealed during the sealing step in box 516. In other words, the sealing step in box 516 both completely seals the chamber below with refuse therein while creating a partially sealed chamber there above wherein the next refuse item can be deposited. In box 520, the extraction assembly 206 may pull the partially sealed chamber of material there through until the desired size of the partially sealed chamber of material is formed. The partially sealed chamber may be sized to receive a single refuse item, such as a dirty diaper, and the controller 402 may utilize the extraction assembly 206 to create the desired partially sealed chamber in box 522.

After the partially sealed chamber of material is formed in box 520, the second roller 210 may be transitioned to the spaced position by the controller 402 using the slide motor 312 and the corresponding sensor 324. The controller 402 may transition the second roller 210 to the spaced position to ensure that refuse can be easily deposited into the partially sealed chamber. In other words, the second roller 210 is moved out of the way of the opening 202 so refuse can be deposited there through and into the partially sealed chamber of material. Once the second roller 210 is in the spaced configuration, the controller 402 may check all sensors 320, 322, 324, 326, 122 among other things to ensure the components are in the expected position in box 524. If the components are in the expected position in box 524, the controller 402 will return to standby in box 502. However, if the components are not in the expected position in box 524, the controller 402 may indicate an error 526. The error 526 may be a visual indicator, audio feedback, or a physical restriction such as locking the lid 110.

Referring now to FIGS. 17a-17d, a section view of shirred material 602 being processed by the refuse sealing assembly 100 as discussed herein is illustrated. In FIG. 17a, the second roller 210 is spaced from the first roller 208 and a partially sealed chamber of material 604 is formed by the shirred material 602. The partially sealed chamber of material 604 has a seal 606 at one end that was either previously formed as part of the shined material 602 or formed as part of a previous sealing process. The partially sealed chamber of material 604 is positioned underneath the opening 202 so refuse can pass there through when the lid 110 is opened.

In FIG. 17b, a refuse item 608, such as a diaper, has been placed in the partially sealed chamber of material 604 and prevented from falling through by the seal 606. In FIG. 17c, the second roller 210 has moved to be adjacent to the first roller 208 and thereby pinch the shined material 602 there between. In FIG. 17c, the arm 302 may also be pivoted towards the heating element 218 to direct the shined material 602 through the rollers 208, 210. Between FIGS. 17c and 17d, the first roller 208 (and second roller 210 via radial arms interconnected with the first roller 208) may be powered by the roller motor 308 to draw the refuse item 608 up towards the rollers 208, 210 until the sensor 320 identifies that the refuse item 608 is within a desired proximity. In FIG. 17d, the refuse item 608 may be sealed through the sealing assembly 216 to create a sealed chamber 610 containing the refuse item 608. The sealed chamber 610 of shined material 602 may then be cut or otherwise separated from the remaining shined material 602 and the sealed chamber 610 may be deposited in the bottom section 104. Further, after the sealed chamber 610 is separated from the shirred material 602 the roller 208, 210 may pull the partially sealed shirred material 602 away from the reservoir 204 to define the next partially sealed chamber of material 604. Once the desired size of the partially sealed chamber of material 604 is formed, the second roller 210 may move to the spaced configuration from the first roller 208 as illustrated in FIG. 17a.

An alternative embodiment of an extraction assembly 700 is illustrated in FIG. 19. The extraction assembly 700 may have first and second arms 702, 704 having a heating element 706 along a contacting surface of the arms 702, 704. In this configuration, the arms 702, 704 may remain substantially parallel to one another but be selectively movable relative to one another to be positioned in an adjacent configuration or a spaced configuration. Further, the arms 702, 704 may also be selectively movable axially along a vertical axis 710 relative to an opening 708. In this configuration, the extraction assembly 700 may provide shined material through the opening 708 in substantially the same way discussed herein for the refuse sealing assembly 100. However, instead of using the rollers 208, 210 to grab and manipulate the shirred material the arms 702, 704 may sandwich the shirred material there between. Further, the arms 702, 704 may move axially away from the opening 708 along the vertical axis 710 with shirred material pinched between the arms 702, 704 to pull shined material from the cartridge 230 in the reservoir 204.

The extraction assembly 700 may keep the arms 702, 704 in a spaced configuration with a partially sealed chamber there between. Once refuse is positioned therein, the arms 702, 704 may move along the vertical axis 710 to be positioned above the refuse in the partially sealed chamber. Next, the arms 702, 704 may move to the adjacent configuration pinching material there between. The heating element 706 may be engaged in the adjacent configuration to seal the refuse within the chamber and provide a partially sealed chamber above the arms 702, 704. The heating element 706 may cut the sealed chamber from the remaining material or a separate cutting element mat pass along the arm 702, 704 to separate the sealed chamber. Next, the arms 702, 704 may pull the partially sealed chamber along the vertical axis 710 to create the desired size for the partially sealed chamber. Then, the arms 702, 704 may separate and wait for refuse to be deposited therein. Accordingly, one aspect of this disclosure contemplates utilizing the extraction assembly 700 instead of the extraction assembly 206.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for sealing refuse in a sealed chamber, comprising:
   providing an opening to deposit refuse into a chamber formed of a material that is partially sealed;
   identifying when refuse is deposited into the partially sealed chamber;
   activating a sealing assembly after refuse is deposited into the chamber to seal the refuse in the chamber defined by the material;
   executing a cutting procedure to separate the sealed chamber from the remaining material, the cutting procedure creating a second chamber being formed by partially sealed material;
   drawing a length of the material from a reservoir containing tubular shirred material with an extraction assembly; and
   executing a chamber minimizing process prior to activating the sealing assembly by sensing the position of refuse within the chamber and adjusting the extraction assembly based on the location of the refuse to ensure the chamber containing the refuse is reduced prior to sealing.

2. The method of claim 1, further comprising selectively positioning a lid over the opening.

3. The method of claim 2, wherein a pre-heating process of the sealing assembly is initiated once the lid is transitioned to an opened position.

4. The method of claim 1, further comprising using a controller to identify when refuse is deposited into the partially sealed chamber, activate the sealing assembly, executing the cutting procedure, and engaging the extraction assembly.

5. The method of claim 1, wherein the sealing assembly both seals the refuse in the chamber and executes the cutting procedure by applying heat to the material.

6. The method of claim 1, wherein the sealing assembly rotates a pivoting arm to selectively press material against a heating element to seal the refuse in the chamber.

7. The method of claim 1, wherein the extraction assembly comprises a first roller and a second roller configure to selectively rotate to draw a length of material from the reservoir.

8. The method of claim 7, wherein the second roller is slidable between an adjacent position wherein the second roller is substantially adjacent to, and rotates with, the first roller, and a spaced position wherein the second roller is spaced from the first roller to allow refuse to pass there between.

9. The method of claim 8, wherein the first and second roller each contain at least one interlocking end that allows the first roller to rotationally drive the second roller when in the adjacent position and the first roller is rotated by a motor.

10. The method of claim 9, wherein the first and second roller each have a plurality of cross-tubes extending between a first end and a second end.

11. The method of claim 1, wherein the extraction assembly comprises a first arm and a second arm, wherein the first and second arm are substantially parallel to one another and movable between a spaced configuration and an adjacent configuration.

12. The method of claim 11, wherein the sealing assembly is positioned in one or both of the first arm and the second arm.

13. The method of claim 12, wherein when refuse is identified in the partially sealed chamber, the first arm and second arm move to the adjacent configuration and the sealing assembly seals the refuse in the chamber.

14. The method of claim 13, wherein the first and second arm move to a lowered position while in the adjacent configuration to draw a length of material from the reservoir.

15. A refuse sealing assembly, comprising:
   an opening selectively covered by a lid and configured to receive refuse there through;
   an annular reservoir defined around the opening and configured to receive a cartridge containing a shirred material;
   an extraction assembly configured to selectively draw a length of a material from the cartridge in the annular reservoir; and
   a sealing assembly configured to selectively seal the shirred material with refuse positioned therein;
   wherein, the extraction assembly draws material from the cartridge to provide a partially sealed chamber for refuse to be positioned within through the opening;
   further wherein, when refuse is positioned within the partially sealed chamber, the sealing assembly seals the chamber to substantially seal the refuse therein after a chamber minimizing process is executed by sensing the position of refuse within the chamber and adjusting the extraction assembly based on the location of the refuse to ensure the chamber containing the refuse is reduced prior to sealing.

16. The refuse sealing assembly of claim 15, further wherein the extraction assembly comprises a first roller and a second roller configure to selectively rotate to draw a length of material from the reservoir.

17. The refuse sealing assembly of claim 16, wherein the second roller is slidable between an adjacent position wherein the second roller is substantially adjacent to, and rotates with, the first roller, and a spaced position wherein the second roller is spaced from the first roller to allow refuse to pass there between.

18. The refuse sealing assembly of claim 17, wherein the first and second roller each contain at least one interlocking end that allows the first roller to rotationally drive the second roller when in the adjacent position and the first roller is rotated by a motor.

19. The refuse sealing assembly of claim 15, wherein the extraction assembly comprises a first arm and a second arm, wherein the first and second arm are substantially parallel to one another and movable between a spaced configuration and an adjacent configuration and the sealing assembly is positioned in one or both of the first arm and the second arm, and the first and second arm move to a lowered position while in the adjacent configurations to draw a length of material from the reservoir.

* * * * *